(12) United States Patent
Jarman et al.

(10) Patent No.: US 6,782,903 B1
(45) Date of Patent: Aug. 31, 2004

(54) TELESCOPING STICK

(76) Inventors: Robert W. Jarman, 1891 Yosemite Rd., Berkeley, CA (US) 94707; Harold C. Stewart, 4525 Laura Way, Union City, CA (US) 94587

( * ) Notice: Subject to any disclaimer, the term of this patent is extended or adjusted under 35 U.S.C. 154(b) by 6 days.

(21) Appl. No.: 10/233,761

(22) Filed: Sep. 3, 2002

(51) Int. Cl.[7] .............................................. A45B 3/12
(52) U.S. Cl. ........................ 135/75; 135/65; 280/820; 280/823; 403/109.3
(58) Field of Search ................ 135/65, 75; 280/819, 280/820, 821, 823; 248/188.5; 403/109.1, 109.2, 109.3, 109.5

(56) References Cited

U.S. PATENT DOCUMENTS

| | | | |
|---|---|---|---|
| 2,682,275 A | | 6/1954 | Eyrich |
| 3,447,805 A | * | 6/1969 | Baley et al. .................. 473/45 |
| 3,455,313 A | | 7/1969 | King |
| 3,711,093 A | * | 1/1973 | Evans ......................... 473/45 |
| 3,987,807 A | | 10/1976 | Varnell |
| 4,061,347 A | * | 12/1977 | Stern et al. ................. 280/821 |
| 4,244,602 A | * | 1/1981 | Allsop et al. ............... 280/821 |
| 4,448,442 A | | 5/1984 | Weber-Henning et al. |
| 4,456,285 A | | 6/1984 | Weber-Henning |
| 5,036,873 A | | 8/1991 | Clayton |
| 5,961,387 A | | 10/1999 | Parsons |
| 6,595,226 B2 | * | 7/2003 | Uemura ....................... 135/75 |

FOREIGN PATENT DOCUMENTS

WO    WO 96/01064    *    1/1996

* cited by examiner

*Primary Examiner*—Winnie Yip
(74) *Attorney, Agent, or Firm*—Jack Lo

(57) ABSTRACT

The present stick is comprised of first and second tubes telescopically connected together. The tubes are biased away from each other by a coaxial coil spring. A shaft is positioned within the first tube, and is biased outwardly from an outer end of the first tube by another coaxial coil spring. A cam is attached to an inner end of the shaft. Holes are arranged on the first tube adjacent the cam. Balls are positioned inside the first tube between the cam and the holes. Detents are arranged along the second tube. When the shaft is released, the balls are forced outwardly through the holes and into detents which are aligned with the holes to lock the first and second tubes together. When the shaft is depressed, the balls are retracted by the cam away from the detents and allow the first and second tubes to telescope.

7 Claims, 5 Drawing Sheets

TELESCOPING STICK

BACKGROUND OF THE INVENTION

1. Field of the Invention

The invention broadly relates to walking sticks and ski poles.

2. Prior Art

Walking sticks and ski poles typically have fixed lengths that do not fit everyone. A stick or pole sized for an average adult may be too long for a short adult or child, or too short for a tall adult. Even if the stick or pole is the correct length for walking or skiing on a horizontal surface, it would be too short when going uphill because the ground ahead of the person is angled up, and too long when going downhill because the ground ahead of the person is angled down.

BRIEF SUMMARY OF THE INVENTION

Accordingly, the primary object of the present stick is to be adjustable in length over a sufficiently large range to fit different people and terrain. Another object is to be very quickly and easily adjustable, for example, when transitioning from going uphill to downhill, or vice versa.

The present stick is comprised of a first tube telescopically connected to a larger second tube. The first and second tubes are biased away from each other by a coaxial coil spring acting against stops on the tubes. A shaft is positioned within the first tube, and is biased outwardly from an outer end of the first tube by another coaxial coil spring acting against stops on the first tube and the shaft. A cam is attached to an inner end of the shaft. Holes are arranged on the first tube adjacent the cam. Balls are positioned inside the first tube between the cam and the holes. Detcents are arranged along the second tube. When the shaft is in an up position, the balls are forced by the cam outwardly through the holes and into detents which are aligned with the holes to lock the first and second tubes relative to each other. When the shaft is depressed, the balls are retracted by the cam away from the detents and allow the first and second tubes to telescope. First and second tubular housings are respectively fixed around the first and second tubes.

DRAWING REFERENCE NUMERALS

Figure 1:
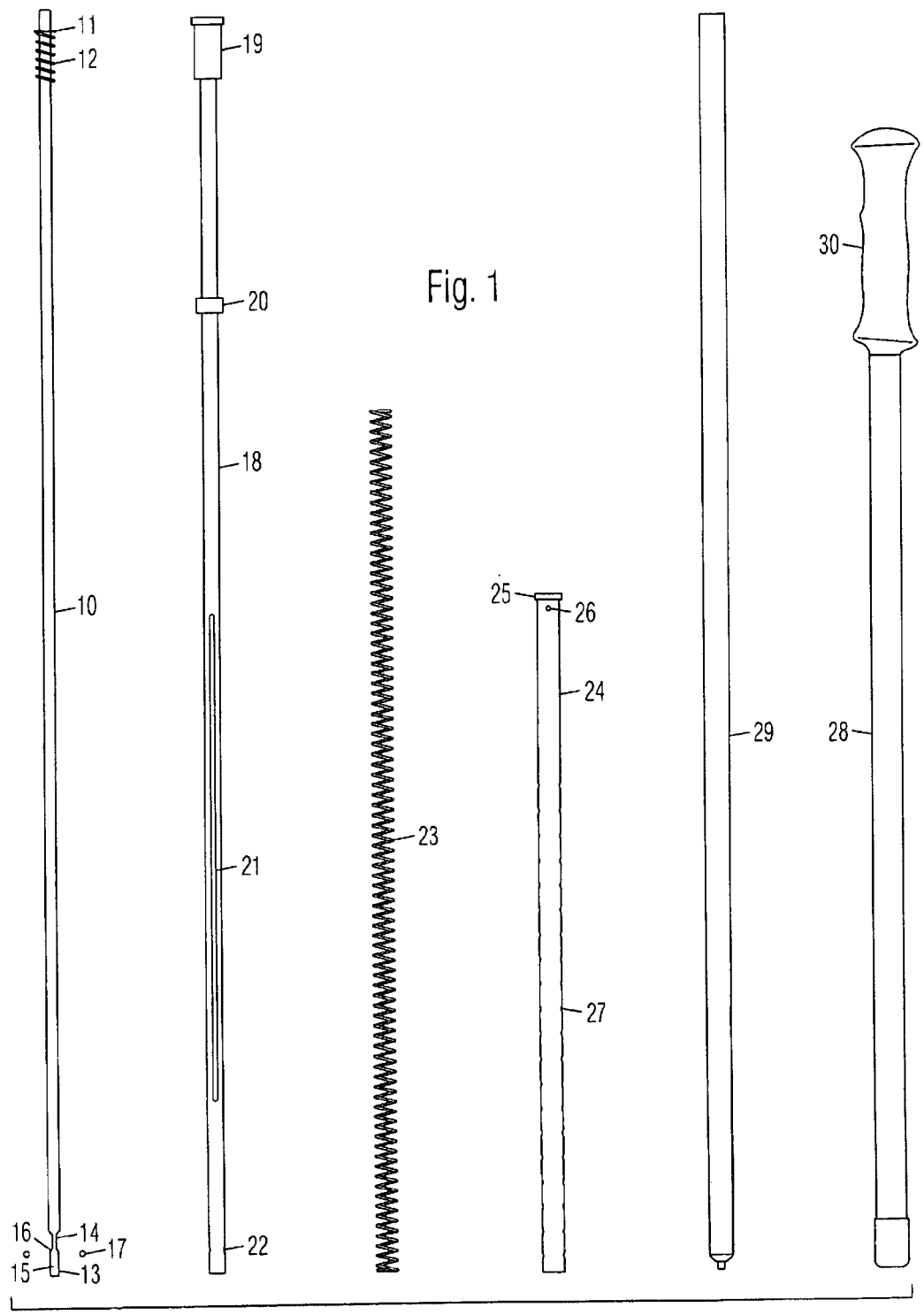
FIG. 1 exploded view of the present telescoping stick.

| | |
|---|---|
| 10. Shaft | 11. Stop |
| 12. First Spring | 13. Cam |
| 14. Narrow Neck | 15. Enlarged Head |
| 16. Tapered Transition | 17. Ball |
| 18. First Tube | 19. Spring Housing |
| 20. Stop | 21. Groove |
| 22. Hole | 23. Second Spring |
| 24. Second Tube | 25. Stop |

DRAWING REFERENCE NUMERALS -continued

| | |
|---|---|
| 26. Pin | 27. Detents |
| 28. First Tubular Housing | 29. Second Tubular Housing |
| 30. Handle | 31. Second Stop |
| 32. Third Stop | |

DETAILED DESCRIPTION OF THE INVENTION

FIG. 1:

A preferred embodiment of the present telescoping stick is shown in an exploded view in FIG. 1. It includes a central shaft 10 with a stop 11, and a first spring 12 positioned against an inner side of stop 11. A cam 13 is attached to an inner end of shaft 10. Cam 13 is comprised of a narrow neck 14 connected to an enlarged head 15 by a tapered transition 16. Balls 17 are for being positioned against cam 13. Alternatively, balls 17 may be replaced with pins or other similar devices.

Shaft 10 is arranged for being positioned inside a first tube 18, which includes a housing 19 for receiving coil spring 12. A stop 20 is arranged around first tube 18. A groove 21 is arranged longitudinally along first tube 18. Holes 22 are arranged on first tube 18 for balls 17 to partially project through but not fall out. Groove 21 and holes 22 are offset 90 degrees from each other about an axis of first tube 18.

First tube 18 is for being positioned inside a second spring 23. Stop 20 on first tube 18 is for being pressed against a first end of spring 23. First tube 18 is also for being positioned inside a second tube 24. A stop 25 at an inner end of second tube 24 is for being pressed against a second end of spring 23. A pin 26 is positioned through second tube 24 and projecting into an interior thereof for engaging groove 21 in first tube 18. Detents 27 are arranged longitudinally along second tube 24 for engaging balls 17 when they project out holes 22 in first tube 18.

First tubular housing 28 is for being fixed around first tube 18, and second tubular housing 29 is for being fixed around second tube 24. Detents 27 are for being covered by second tubular housing 29 to protect them from dirt. Part of second tubular housing 29 is for being positioned inside first tubular housing 28, wherein an outer end of second tubular housing 29 projects outside first tubular housing 28. A handle 30 is attached to an outer end of first tubular housing 28. Spring housing 19 on first tube 18 is positioned inside first tubular housing 28 and handle 30.

Figure 2:
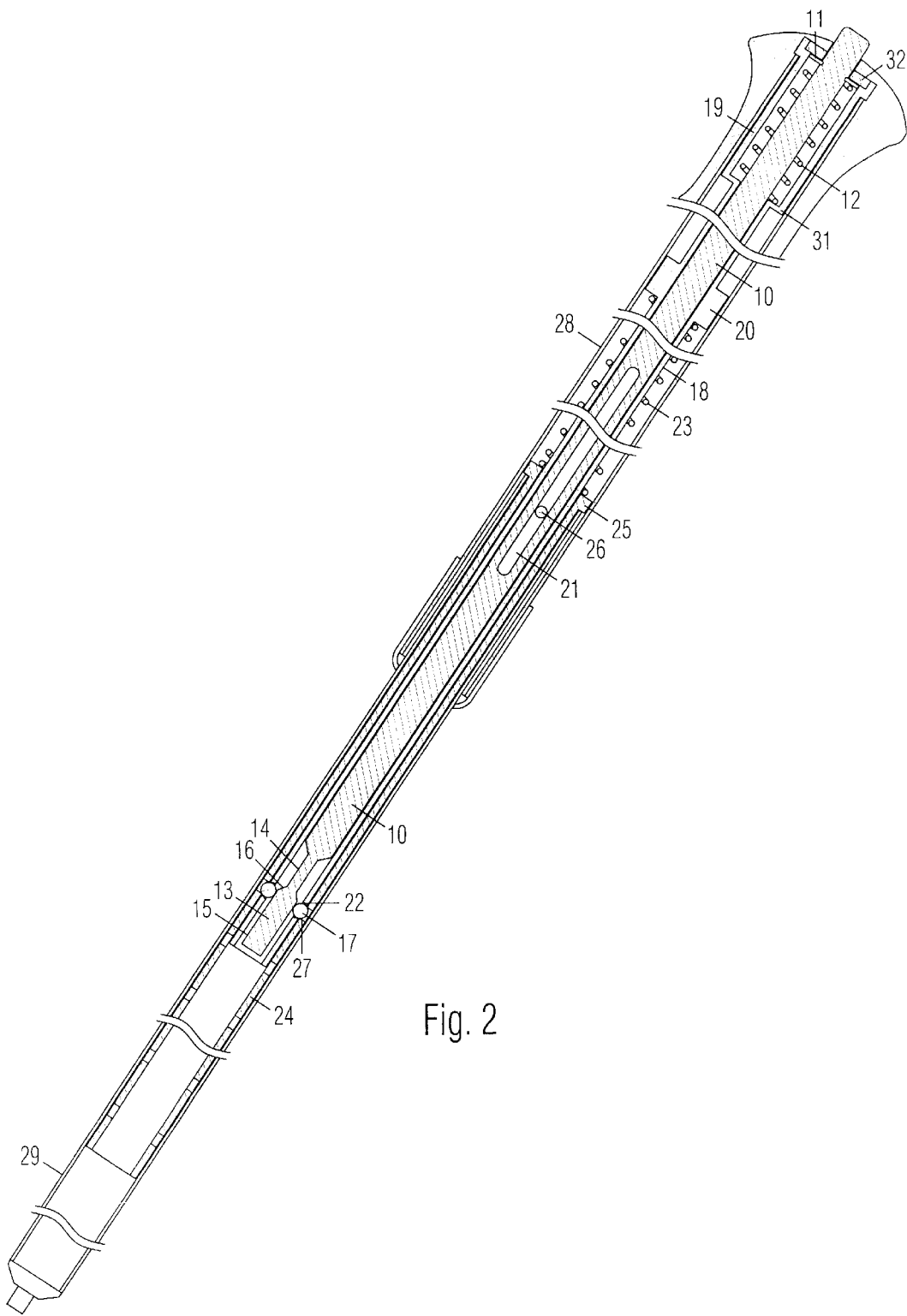
FIG. 2 is sectional view thereof when fully extended.

FIG. 2:

The present stick is shown assembled in a sectional view in FIG. 2. First tube 18 is telescopically connected to larger second tube 24. First and second tubes 18 and 24 are biased away from each other by first coaxial coil spring 23 acting respectively against first and second stops 20 and 25 on the tubes. Shaft 10 is positioned within first tube 18. An outer end of shaft 10 is biased outwardly from an outer end of first tube 18 by second coaxial coil spring 12 acting against first stop 11 on shaft 10 and a second stop 31 on first tube 18. Housing 19 extends between second stop 31 and a third stop 32 which limits the outward movement of shaft 10.

Cam 13 is attached to inner end of shaft 10. Cam 13 is preferably comprised of narrow neck 14 connected to the inner end of shaft 10, and enlarged head 15 connected to the distal end of neck 14 by tapered transition 16. Cam 13 may be of another shape, as long as it is arranged to move balls 17 transversely relative to the sides of first tube 18. Holes 22 are arranged on first tube 18 adjacent cam 13. Balls 17 are positioned inside first tube 18 between cam 13 and holes 22.

Detents 27 are arranged longitudinally along second tube 24. When shaft 10 is in the up position in FIG. 2, balls 17 are forced by cam 13 outwardly through holes 22 and into detents 27 which are aligned with holes 22. First and second tubes 18 and 24 are thus locked relative to each other. Pin 26 is positioned in groove 21 to prevent shaft 10 from rotating so as to keep balls 17 aligned with holes 22.

Figure 3:
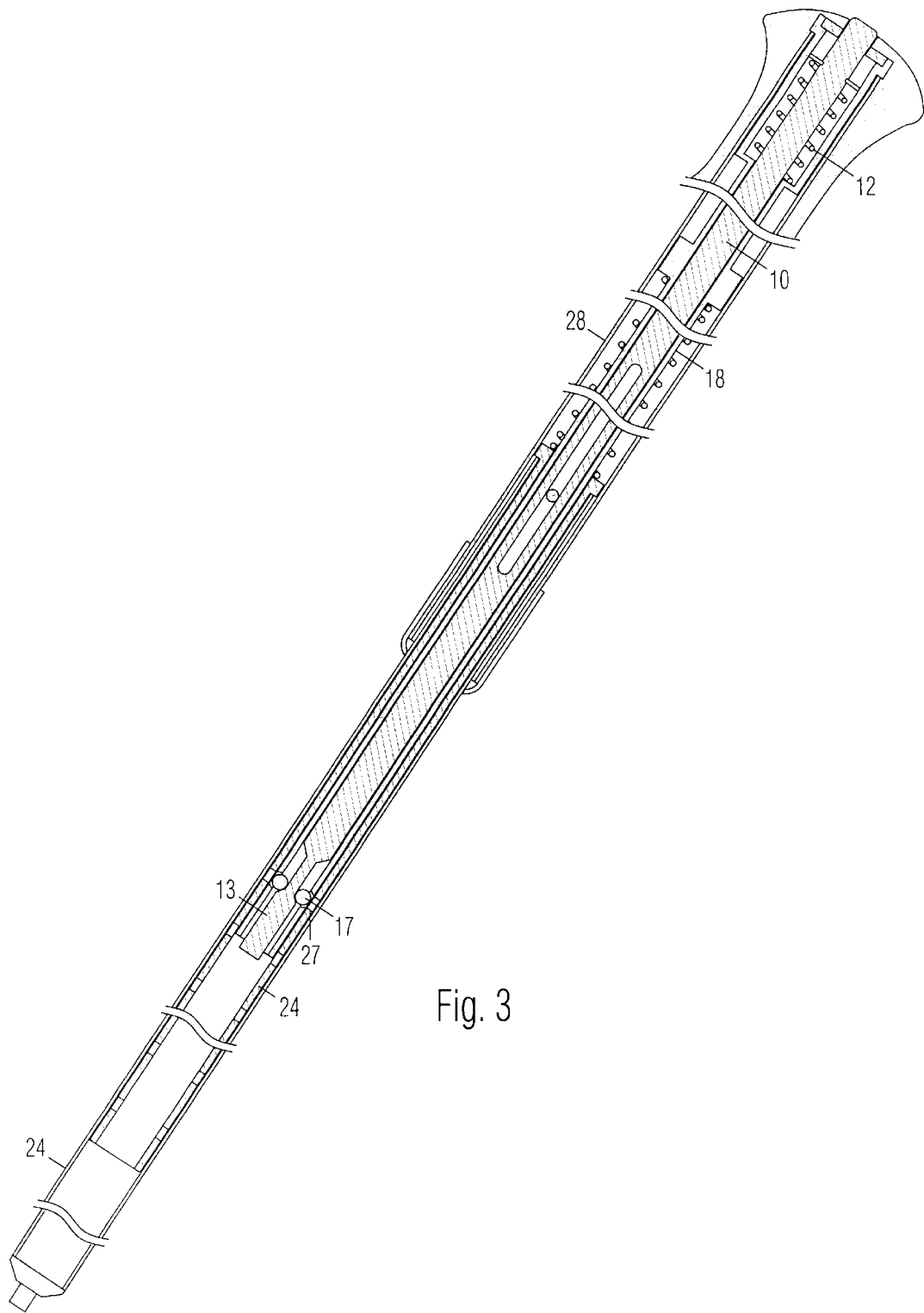
FIG. 3 side sectional view thereof when a shaft is depressed to release the stick for telescope.

FIG. 3:

The stick is shown in FIG. 3 in the first step of telescoping. Shaft 10 is depressed against the pressure of spring 12, and balls 17 are retracted by cam 13 from detents 27 in second tube 24 to free first and second tubes 18 and 24 for telescoping.

Figure 4:
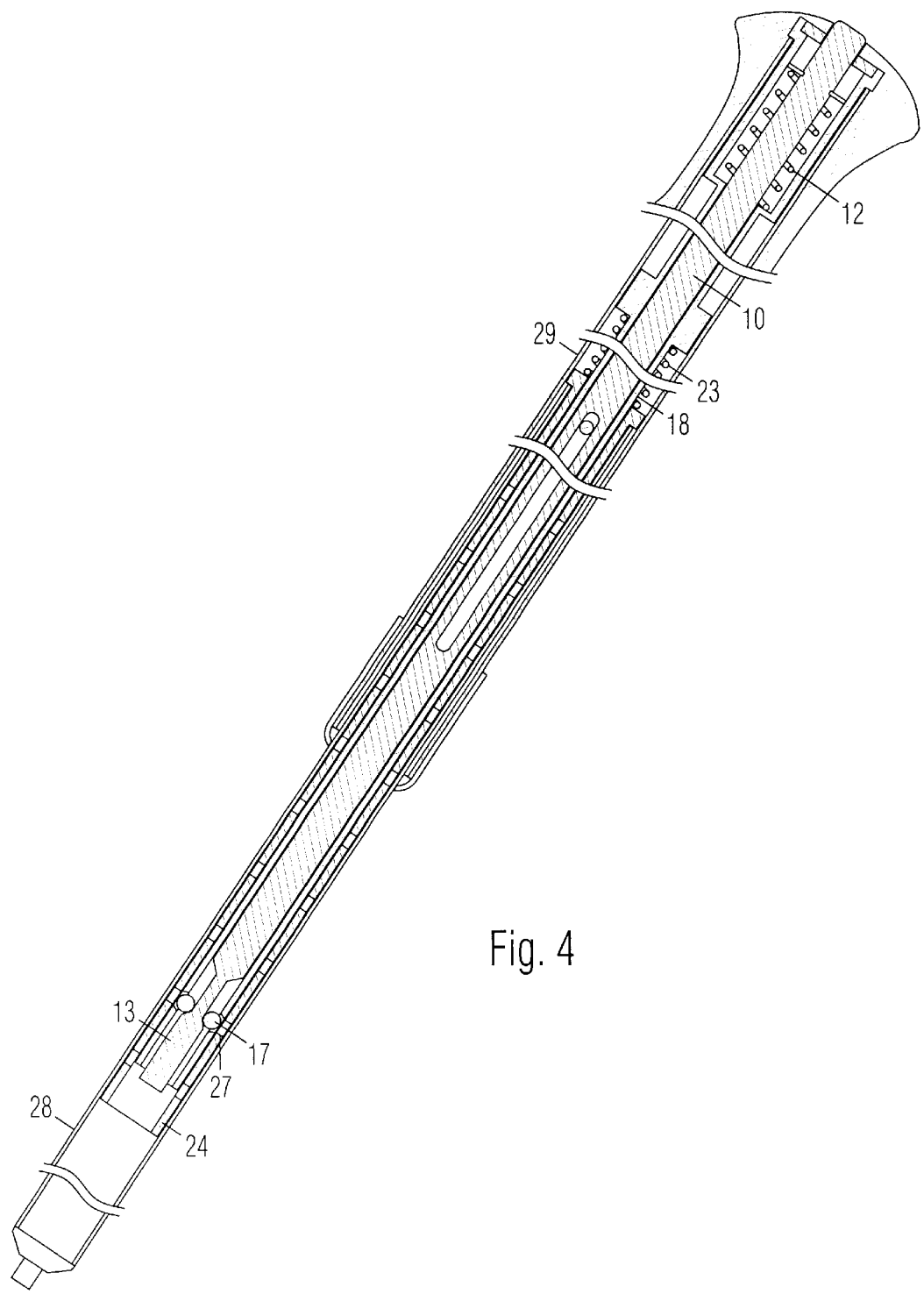
FIG. 4 is sectional view thereof when the stick is shortened.

FIG. 4:

In a second step of telescoping shown in FIG. 4, the stick is shortened by pushing first and second tubes 18 and 24 together against the pressure of spring 23. The stick may also be extended by allowing spring 23 to automatically push apart first and second tubes 18 and 24.

Figure 5:
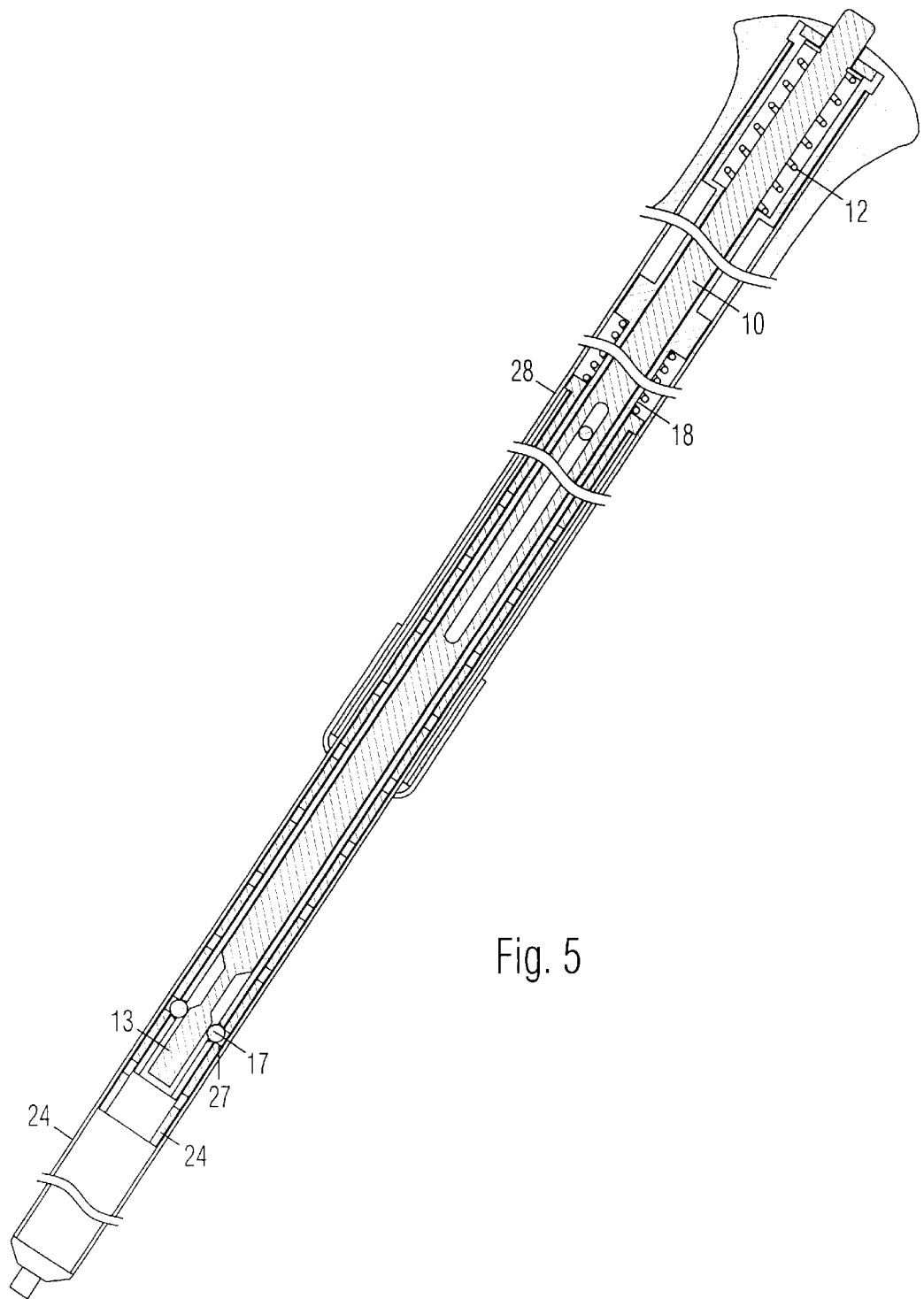
FIG. 5 is a side sectional view thereof when the shaft is released to lock the stick in position.

FIG. 5:

In the last step of telescoping shown in FIG. 5, shaft 10 is released and biased outwardly by spring 12. Balls 17 are pushed out by cam 13 to engage detents 27 in second tube 24 and lock the stick in the selected position.

Although the foregoing description is specific, it should not be considered as a limitation on the scope of the invention, but only as an example of the preferred embodiment. Many variations are possible within the teachings of the invention. For example, different attachment methods, fasteners, materials, dimensions, etc. can be used unless specifically indicated otherwise. The relative positions of the elements can vary, and the shapes of the elements can vary. Therefore, the scope of the invention should be determined by the appended claims and their legal equivalents, not by the examples given.

I claim:

1. A telescoping stick, comprising:
   a central shaft with an outer end and an inner end;
   a first tube telescopically positioned around said shaft, wherein said outer end of said shaft is positioned outside an outer end of said first tube;
   a first spring biasing said shaft outwardly from said outer end of said first tube;
   a hole extending through a side of said first tube adjacent an inner end thereof;
   a second tube telescopically positioned around said first tube, wherein said inner end of said first tube is positioned within said second tube;
   a second spring biasing said first tube and said second tube to telescopically elongate;
   a plurality of detents on said second tube arranged longitudinally thereon;
   a cam attached to said inner end of said shaft; and
   a ball positioned between said cam and said first tube; wherein
   when said shaft is released, said ball is biased by said cam partially through said hole on said first tube and into one of said detents which is aligned with said hole to lock said first tube relative to said second tube; and
   when said shaft is depressed, said ball is retracted by said cam away from said one of said detents to unlock said first tube and said second tube for telescoping.

2. The telescoping stick of claim 1, wherein said cam is comprised of a narrow neck connected to said inner end of said shaft, and an enlarged head connected to a distal end of said neck by a tapered transition.

3. The telescoping stick of claim 1, further including a first tubular housing fixed around said first tube to cover said first spring and said second spring, and a second tubular housing fixed around second tube to cover said detents.

4. A telescoping stick, comprising:
   a central shaft with an outer end and an inner end;
   a first tube telescopically positioned around said shaft, wherein said outer end of said shaft is positioned outside an outer end of said first tube;
   a first spring biasing said shaft outwardly from said outer end of said first tube;
   a hole extending through a side of said first tube adjacent an inner end thereof;
   a groove extending along said first tube;
   a second tube telescopically positioned around said first tube, wherein said inner end of said first tube is positioned within said second tube;
   a second spring biasing said first tube and said second tube to telescopically elongate;
   a plurality of detents on said second tube arranged longitudinally thereon;
   a cam attached to said inner end of said shaft;
   a ball positioned between said cam and said first tube; and
   a pin fixed to an interior of said second tube and movably positioned within said groove on said first tube to prevent said first tube and said second tube from rotating relative to each other, and maintaining a relationship between said cam and said holes on said first tube; wherein
   when said shaft is released, said ball is biased by said cam partially through said hole on said first tube and into one of said detents which is aligned with said hole to lock said first tube relative to said second tube; and
   when said shaft is depressed, said ball is retracted by said cam away from said one of said detents to unlock said first tube and said second tube for telescoping.

5. The telescoping stick of claim 4, wherein said cam is comprised of a narrow neck connected to said inner end of said shaft, and an enlarged head connected to a distal end of said neck by a tapered transition.

6. The telescoping stick of claim 4, further including a first tubular housing fixed around said first tube to cover said first spring and said second spring, and a second tubular housing fixed around second tube to cover said detents.

7. A telescoping stick, comprising:
   a central shaft with an outer end and an inner end;
   a first tube telescopically positioned around said shaft, wherein said outer end of said shaft is positioned outside an outer end of said first tube;
   a first spring biasing said shaft outwardly from said outer end of said first tube;
   a hole extending through a side of said first tube adjacent an inner end thereof;
   a second tube telescopically positioned around said first tube, wherein said inner end of said first tube is positioned within said second tube;
   a second spring biasing said first tube and said second tube to telescopically elongate;
   a plurality of detents on said second tube arranged longitudinally thereon;
   a cam attached to said inner end of said shaft, wherein said cam is comprised of a narrow neck connected to said inner end of said shaft, and an enlarged head connected to a distal end of said neck by a tapered transition;

a ball positioned between said cam and said first tube; and a first tubular housing fixed around said first tube to cover said first spring and said second spring;

a second tubular housing fixed around second tube to cover said detents; wherein when said shaft is released, said ball is biased by said cam partially through said hole on said first tube and into one of said detents which is aligned with said hole to lock said first tube relative to said second tube; and when said shaft is depressed, said ball is retracted by said cam away from said one of said detents to unlock said first tube and said second tube for telescoping.

* * * * *